United States Patent
Raphel et al.

(10) Patent No.: US 8,806,593 B1
(45) Date of Patent: Aug. 12, 2014

(54) GUEST ACCOUNT MANAGEMENT USING CLOUD BASED SECURITY SERVICES

(75) Inventors: Jose Raphel, Austin, TX (US); Kailash Kailash, San Jose, CA (US); Manoj Shriganesh Apte, San Jose, CA (US); Jagtar S Chaudhry, Saratoga, CA (US)

(73) Assignee: Zscaler, Inc., San Jose, CA (US)

( * ) Notice: Subject to any disclaimer, the term of this patent is extended or adjusted under 35 U.S.C. 154(b) by 38 days.

(21) Appl. No.: 13/111,711

(22) Filed: May 19, 2011

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ............ *H04L 63/10* (2013.01); *H04L 63/0892* (2013.01)
USPC .............................................................. 726/6

(58) Field of Classification Search
CPC ............................. H04L 63/10; H04L 63/0892
USPC ............................................................ 726/6
See application file for complete search history.

(56) References Cited

U.S. PATENT DOCUMENTS

| | | | |
|---|---|---|---|
| 7,577,742 B1 * | 8/2009 | Prohofsky | 709/226 |
| 8,225,383 B1 * | 7/2012 | Channakeshava et al. | 726/7 |
| 8,544,072 B1 * | 9/2013 | Masone et al. | 726/6 |
| 2007/0255838 A1 * | 11/2007 | Hassan et al. | 709/227 |
| 2008/0083014 A1 * | 4/2008 | Lim | 726/1 |
| 2008/0133726 A1 * | 6/2008 | Richardson et al. | 709/223 |
| 2009/0222878 A1 * | 9/2009 | Walsh et al. | 726/1 |
| 2009/0300045 A1 * | 12/2009 | Chaudhry et al. | 707/102 |
| 2010/0125911 A1 * | 5/2010 | Bhaskaran | 726/23 |
| 2010/0154024 A1 * | 6/2010 | Boxmeyer et al. | 726/1 |
| 2010/0217850 A1 * | 8/2010 | Ferris | 709/223 |
| 2011/0047608 A1 * | 2/2011 | Levenberg | 726/7 |
| 2011/0218892 A1 * | 9/2011 | Jeong et al. | 705/30 |
| 2011/0247045 A1 * | 10/2011 | Rajagopal et al. | 726/1 |
| 2011/0265147 A1 * | 10/2011 | Liu | 726/4 |
| 2012/0167185 A1 * | 6/2012 | Menezes et al. | 726/5 |

* cited by examiner

*Primary Examiner* — Carolyn B Kosowski
*Assistant Examiner* — Jason C Chiang
(74) *Attorney, Agent, or Firm* — Clements Bernard PLLC; Lawrence A. Baratta, Jr.; Christopher L. Bernard

(57) ABSTRACT

Guest accounts arise in a variety of ways. Hotels, Coffee Shops, internet cafes, internet kiosks, etc provide internet access to its guests, aka customers. Cloud based security services can serve as a platform for supporting efficient and safe guest account management. Guest accounts are managed by the cloud service and are associated and disassociated with individuals as needed by the guest account provider. The cloud service can also provide a guest account provider with greater control over guest account usage and accountability.

20 Claims, 8 Drawing Sheets

FIG. 4

Example Inc.

Policy  Reports  Hide Menu operator@example.com  Logout

Manage Guest Users
No Changes Pending

Register/De-register Guests
Register Guests
Manage Registered Guests

Guest Registration Portal for Sunnyvale

Register a new Guest
Enter Guest Details

| | | | | |
|---|---|---|---|---|
| Full Name | John Doe | | | |
| Contact Phone number | 000000 | | | |
| Current Date | 5/2/2010 | | Time | 10:15:00 |
| Valid Until | 5/2/2010 | | Time | 18:00:00 |
| Send Temporary Password | By Print | | | |

Register    Cancel

GUEST ACCOUNT MANAGEMENT USING CLOUD BASED SECURITY SERVICES

I. BACKGROUND

The present invention relates to computerized systems, software and methods for guest account management using cloud based security services.

Guest accounts arise in a variety of ways. Hotels, Coffee Shops, internet cafes, internet kiosks, etc. provide internet access to their guests (e.g., customers). The guest's internet access is typically short-lived, lasting from a couple of minutes to a couple of days. Guest accesses also occur in enterprises where partners, vendors, contract workers, and/or students are the guests. In all these scenarios, though the number of concurrent visitors is small at any point in time, the number of unique visitors over an extended period of time is significantly large. Similar situation arises in retail shops where the employees work on an hourly basis, and often at-will. Internet access may be given as an incentive or given as part of the job. Using a very large collection of individual user accounts for each such guest is expensive as well as time consuming. Yet another example of guest access to internet arises in conference venues, sports venues and exhibition stalls. For a short period of time, a large number of guests arrive, and providing them with safe internet access is a challenge. It is very expensive to provide on-premise security in such venues and to manage the security providing appliances.

In conventional guest management environments, guest users are enabled to access network resources through an enterprise network using a guest user account. A guest user account may be created for a guest for a limited time. Guest account credentials of the guest account may be provided to the guest to use the guest account using any of a variety of techniques, for example, by scanning a guest access card, credit card or mobile telephone of guest user, and providing the guest account credentials to the user based on the information obtained. A guest access management server located on-premise may be configured to generate and maintain guest accounts, authenticate guest users, and track and log guest activity. The on-premises overhead in connection with guest user management is the same or more than for management of permanent user accounts. A VLAN technology may be used to separate guest traffic from host enterprise traffic on the host enterprise network. After a guest user is authenticated, communications to and from the guest user may be routed to a guest VLAN. This mechanism isolates guests from the normal users using the existing on-premise security infrastructure. On-premise infrastructure, however, is generally not intended to absorb an elastic user population in the form of guests.

Another issue with current guest management approaches using on premise equipment is its inability to scale with increased guest account usage. On premise equipment may be used by the permanent and non-mobile workforce; however, in order to accommodate a large number of guest accounts, the enterprise may need to upgrade or expand its investment in on premise management hardware and software.

In addition, guest accounts are one of the most abused types of user accounts. They are often used in performing illicit activities such as (1) transactions on illegal sites such as pornography, internet violence, subversive activities, activities of terror, etc. or (2) transactions that may involve fraud or theft. Many cyber crimes are conducted through guest accounts. Hence, safety of guest accounts is desirable. In conventional guest management environments that allow re-use of permanent guest accounts, guest accounts usually do not have an associated user name, or other identifying information, and thus, the log records achieve anonymity for the guest user. Since there is no real user associated with the guest accounts, its audit trails cannot bind a security incident with a suspect subject. One method to avoid this is to provide every user with a permanent account. As described above, however, such an approach is expensive and time consuming.

II. SUMMARY

The present application discloses technology for supporting guest account management. Guest account management is applicable in a variety of situations such as discussed above. In the computer products, systems and methods described in this application, a cloud service computer receives a request for a guest account for a particular user. Based on the request, a guest account is associated with the particular user. Initial credentials such as a password or a certificate are generated and provided to an output device from which the particular user can receive the initial credentials. From a client device, the particular user logs into the cloud service using the guest account and the initial credentials. In some embodiments, the particular user is then prompted to generate or specify new credentials used for subsequent login using the guest account. The cloud service receives one or more service requests from the client device associated with the particular user. The cloud service inspects the service requests and/or the results of those service requests for compliance with one or more service policies established for the guest account, and/or established for a user group of which the guest account is a member. If the inspection is passed, results of service requests are forwarded to the client device. In some implementations, the cloud service may add information about the service request and/or results to an activity log associated with the particular user.

The foregoing general description and the following detailed description are exemplary and explanatory only and do not restrict the claims directed to the invention. The accompanying drawings, which are incorporated in and constitute a part of this specification, illustrate one or more embodiments of the invention and together with the description, serve to explain the principles of the disclosed technology.

III. BRIEF DESCRIPTION OF THE DRAWINGS

FIG. 4 depicts an exemplary guest account registration interface that requests delivery of initial credentials by SMS.

FIG. 6 depicts an exemplary guest account registration interface that requests delivery of initial credentials by print.

FIG. 8 depicts an exemplary guest account management interface.

IV. DETAILED DESCRIPTION

This application refers in detail below to the exemplary embodiments of guest management systems, methods and software; examples of which may be illustrated in one or more of the accompanying drawings. Wherever possible, the application uses the same reference numbers throughout the drawings to refer to the same or similar items.

Cloud based security (for example ZScaler Cloud™) is an emerging framework to deploy and upgrade security solutions for multiple service subscribers without causing the upgrade delay found in conventional premise security appliances and applications. Cloud based security is the common core of any cloud based service offering. Security services such as URL and content based message filtering, Malware Scanning, Data Leakage Protection, may be performed by the use of one or more computers in the cloud based service architecture. Additional specific services may be offered through appropriate configuration of policies available in the cloud based service.

Since cloud based security can scale on user demand, it is an apt platform for supporting guest account management. It avoids the maintenance of expensive on-premise security appliances. It also can provide a supplier of guest accounts with a greater ability to track and audit online activities conducted with the guest accounts.

Figure 1:
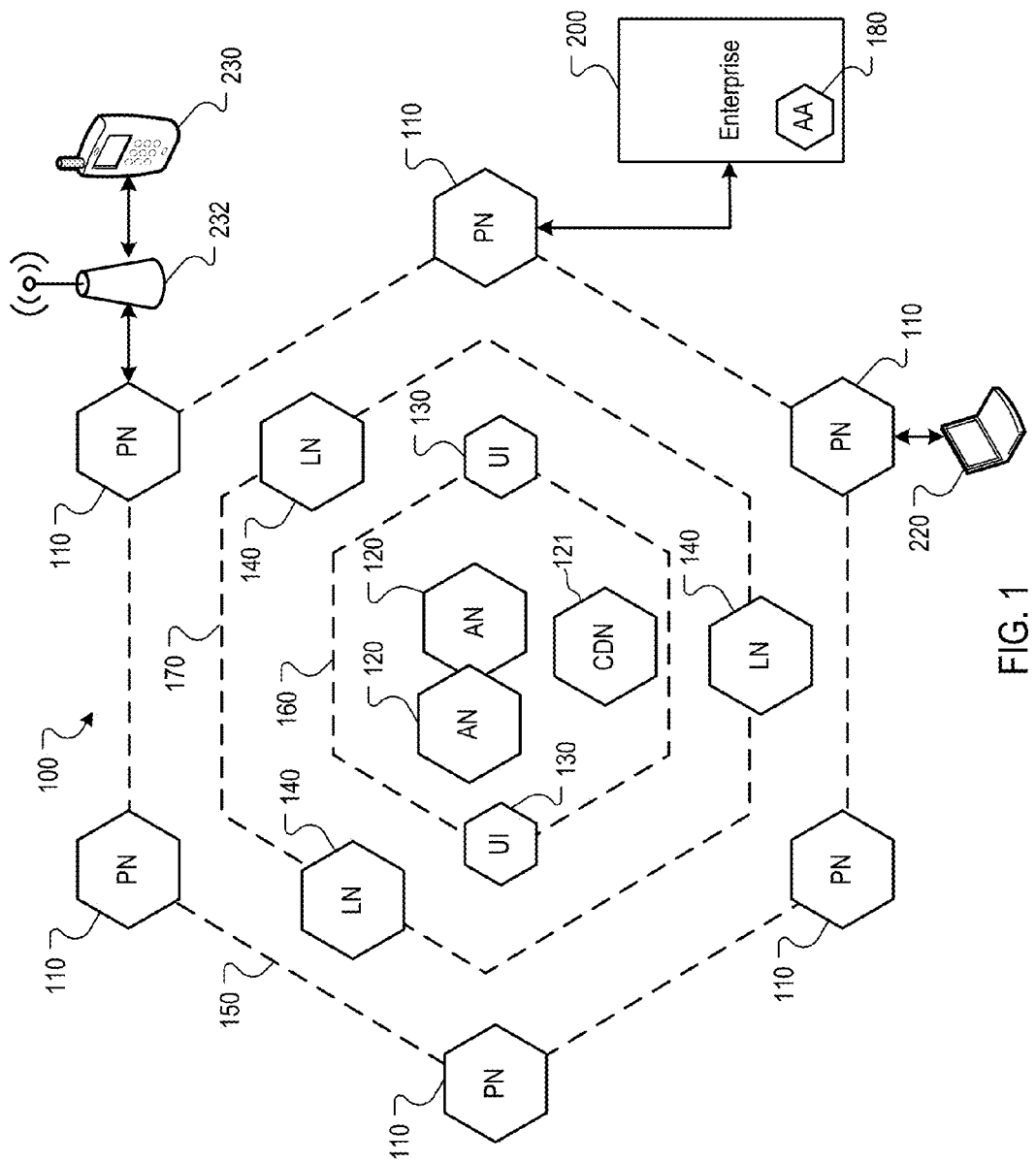
FIG. 1 is a block diagram of a cloud security system.
Figure 2:
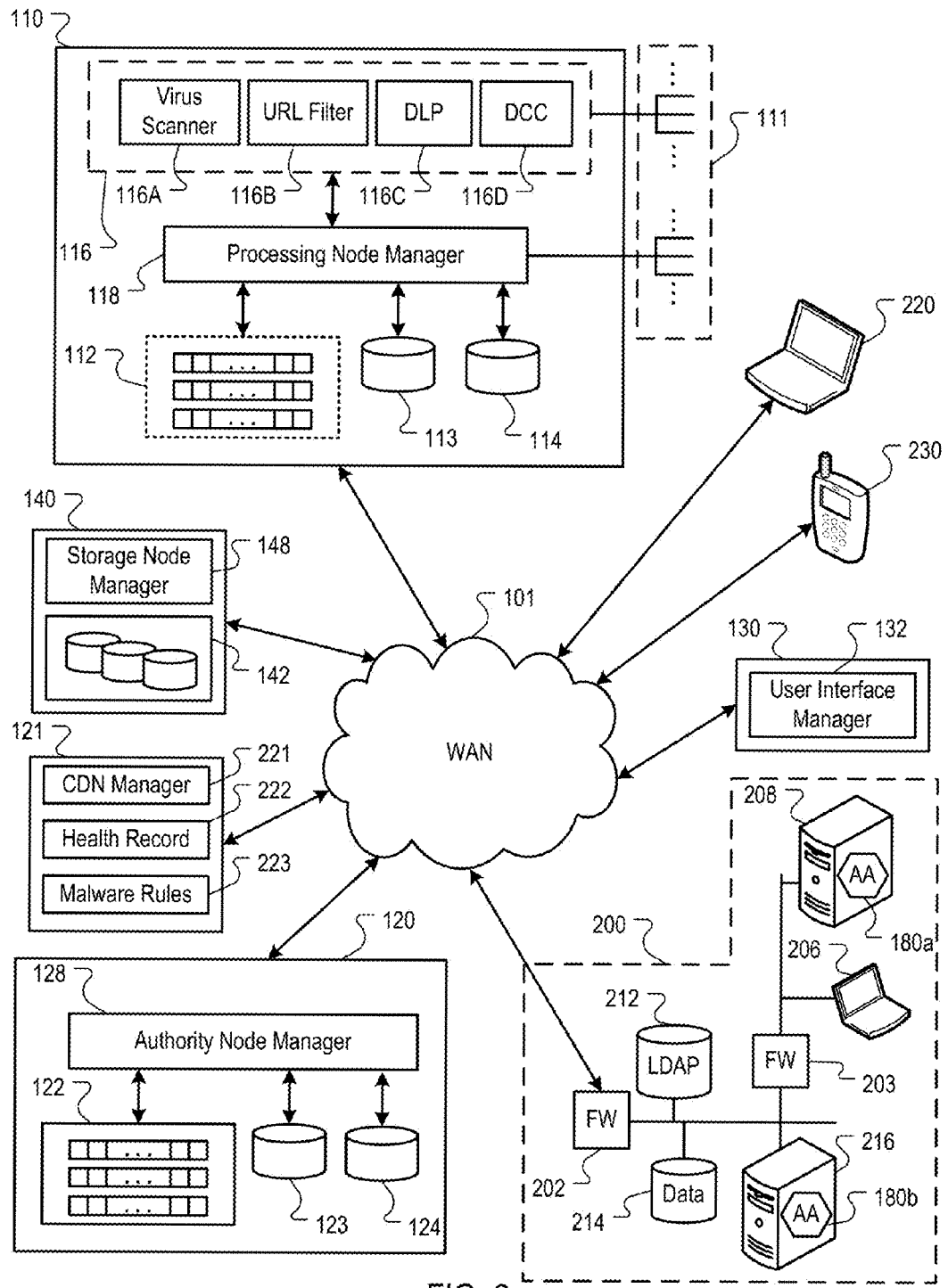
FIG. 2 is a block diagram of the system of FIG. 1 in which the components of FIG. 1 are illustrated in more detail.

FIG. 1 is a block diagram of a cloud based security system 100. The system 100 can, for example, be implemented as an overlay network in a wide area network (WAN), such as the Internet. The system 100 includes content processing nodes 110 that detect and preclude the distribution of security and performance threats, e.g., malware, sent from or requested by an external system. Example external systems can include an enterprise 200, a computer device 220, and a mobile device 230, or other network and computing systems.

The term malware is used throughout the present disclosure to include any undesirable content that can pose a security risk or negatively impact the performance of a computing device, including, for instance, viruses, spyware, and spam.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c1, c2, \ldots, cm]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

The system 100 also includes a configuration distribution node (CDN) 121 that coordinates each of the processing nodes 110 and storage nodes 140. The CDN 121 can perform all of the functions of an authority node 120. According to some implementations, the CDN 121 can be an authority node 120. Thus, although illustrated as a separate component from the authority nodes 120, the CDN 121 may represent one such authority node 120. The CDN 121 can act as a master authority node by receiving data corresponding to system activity from each of the processing nodes 110 and storage nodes 140, which are each operable to forward the data to the CDN 121.

In some implementations thousands of system activities can be monitored at predefined intervals within each of the systems monitored by the processing nodes 110 and storage nodes 140. Data corresponding to at least some of the system activity is communicated from the processing nodes 110 and storage nodes 140 to the CDN 121. For instance, data corresponding to a few hundred system activities can be routinely communicated to the CDN. System activities can include operating system activity (e.g., disk I/O, File I/O, System Call), network events (e.g., packets received, packets sent, retransmissions, errors), and/or content inspection events (e.g., operation of anti-virus software, the occurrence or results of content inspection).

As described in greater detail below, the CDN 121 receives data corresponding to system activity from multiple networks during normal operation of the networks. The CDN 121 thus allows collection and monitoring of data from multiple, aggregated networks over a wide geographical distance. That data is stored and accessible by the CDN 121 for comparison to data collected corresponding to subsequent system activity. When the subsequent data falls outside of parameters based on the data representing normal operation of the networks, the CDN 121 can generate an alert.

An alert can be to an administrator associated with the system 100 or one or more of the networks, and can be an e-mail, instant message, or the like. An alert can also include corrective action to prevent activity that is causing generation of the data that does not represent the normal operation of the monitored networks.

Other application layer functions within the system 100 can be provided in the application layer, such as a user interface front-end 130, also referred to herein as view node. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in storage nodes 140, which serve as a data storage layer 170. Each storage node 140 can store data related to security operations and network traffic processed by the processing nodes 110 for each external system.

In some implementations, the storage node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or storage node 140 data can be further encrypted, e.g., so that only the enterprise (or user if a single user account) can have access to the storage node 140 data for its account. Other processes of anonymizing, obfuscating, or securing storage node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, chose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§2.3 Example CDN Architecture

The CDN 121 coordinates each of the processing nodes 110, and storage nodes 140. As described above, according to an implementation, the CDN 121 can represent an authority node 120. Thus, the CDN 121 can perform all of the functions of an authority node 120 and can receive data corresponding to system activity from each of the processing nodes 110 and storage nodes 140.

The CDN 121 includes a CDN manager 221 for managing the operations of the CDN. Because the CDN 121 can represent an authority node 120, in some implementations the CDN manager 221 may be implemented or be the same as the authority node manager 128. The CDN manager 221 can facilitate the collection and/or receipt of data corresponding to system activities from each of the processing nodes 110, storage nodes 140, and authority nodes 120. The data can be stored in a heath record 222. In implementations where the CDN 121 is an authority node, the health record 222 can exist within the authority node 120. According to some implementations, the CDN manager 221 can store data representing changes in system state within the health record 222. The health record 222 can, for instance, be implemented via one or more tables.

According to some implementations, the CDN manager 221 can collect data (e.g., sample data) during a sampling interval in which the network is operating under normal conditions. The sample data can be collected at sampling intervals that capture small changes in the network, such as at 1-10 samples per second for each system activity occurring at each node in the system. The sample data can be stored in the health record 222. According to some implementations the CDN manager can 221 use the sample data to generate and store one or more threshold values that indicate the range of possible activities that are considered normal.

For instance, for a particular system activity the CDN manager 221 can identify maximum or minimum threshold values from the sample data, where the threshold values representing the range of acceptable values for the system to be considered operating normally. Threshold values can be stored for each type of activity such that collection of subsequent data during system monitoring can be compared against the values by the CDN manager 221 to determine if the system is operating normally.

After the sampling interval is complete, the CDN manager 221 can collect data (e.g., observed data) to monitor the health of the network and to identify when malicious activity may be taking place. The observed data can be collected at intervals that capture small changes in the network, such as at 1-10 samples per second for each system activity occurring at each node in the system. In some implementations the observed data can be stored in the health record 222.

The CDN 221 determines if the observed data represents the normal operation of the monitored networks based on malware rules 223 that instructs the CDN manager 221 on whether the observed data indicates that the network is operating within a normal range based on the sample data. In implementations where the CDN 121 is an authority node 120, the malware rules 223 can exist within the authority node 120. As an example, the malware rules 223 may indicate that the system is operating normally when the observed data falls within a certain range or percentage of an average of sample data for a particular system activity. For instance, if during a sample interval of 10 seconds there are 10 web-site redirections, and during a subsequent observed interval of 10 seconds there are 11 web-site redirections, then the malware rules 223 may indicate that the system is operating under normal conditions. On the other hand, during a subsequent observed interval of 10 seconds there are 20 web-site redirections, then the malware rules 223 may indicate that malicious activity has been detected. Thus, the CDN manager 221 can determine if the observed data represents the normal operation of the monitored networks by comparing the observed data to sample data using one or more malware rules. According to some implementations, the malware rules can identify one or more threshold values representing one or more acceptable values, ranges, or percentages of sample data during the normal operation of the plurality of monitored networks.

According to some implementations, the CDN manager 221 will update the health record 222 only with changes in observed data. For instance, if many system activities do not change during system monitoring, data for those activities are not constantly updated by the CDN manager 221. By updating only changed data the CDN manager 221 minimizes the processing and read/write activities required to maintain the health record 222 and monitor the system 100.

According to some implementations the nodes will not transmit observed data to the CDN 121 when the data is unchanged from a previous interval, or changed by a minimum amount. The CDN 121 can be configured to transmit rules to the nodes instructing each when minimal or no observed data needs to be transmitted to the CDN 121, thus reducing the amount of network traffic required to identify malicious activity. For instance, the CDN 121 can instruct storage nodes not to report observed data for each system activity where the data is within 5% of the previous value of such system activity.

Using the health records 222 and malware rules 223, the CDN manger 221 can detect the status of each node in the system (e.g., live, congested, idle, busy), malicious code outbreaks by observing changes in system activity data (e.g., the number of viruses detected are higher than normal), and virus flow detection. When the observed data indicates that the networks are not operating normally (i.e., within a normal operating range as provided by the sampling data), the CDN 121 can generate an alert. An alert can be communicated to an administrator associated with the system 100 or one or more of the networks, and can be an e-mail, instant message, or the like. An alert can also include corrective action to prevent activity that is causing generation of the data that does not represent the normal operation of the monitored networks.

§3.0 Global System Monitoring

As described above, the distributed system of processing nodes, storage nodes, and authorizing nodes can be coordinated through a CDN 121. The CDN 121 monitors system health at system, region and geographic levels. After sampling data is collected for a large number of system activities across networks, observed data is collected for some or all of those system activities at fine intervals of time. Using the observed data the CDN detects abnormalities in the system, such as virus and spam outbreaks and targeted attack patterns.

A large number of system activities (e.g., in the thousands) can be tracked and monitored at a predefined interval in each of the nodes and their corresponding networks. Data corresponding to a subset (e.g., a few hundred) of these activities are communicated to the CDN 121 for use in monitoring the health of the nodes and identifying the outbreak of virus, spam and other undesirable network traffic in networks connected to the nodes.

§3.0.1 Identifying Abnormal System Activities

Abnormalities in the system are identified by the CDN manager 221 due to a sudden increase in certain system activities, such as an increase in the detection of malware, viruses, spam, bad content, and the like. These malware activities are indicated by a number of system activities collected in the observed data by the CDN 121.

A first system activity are redirects identified within processing nodes at regional, country, and global levels. Observed data can include the number of such redirects. Malware infection can be detected by monitoring the redirection of request to new locations. Although there may be legitimate redirects, the CDN 121 is configured to identify deviation from a 'normal' number of redirects for a certain predefined number of web transactions collected during a sampling interval. Such as deviation can indicate malicious activity and abnormal operation of one or more networks where the redirections occur. For instance, the malware rules 223 within the CDN 121 may indicate that a 25% increase in redirects over a particular time period is indicative of a malware infection (i.e., malware activity).

Another system activity is a policy violation. Observed data can include the number of policy violations occurring within a network. For instance, a policy violation can occur when an employee is accessing a web site that the employee is not supposed to visit due to his or her company's policies. Typically, the number of such policy violations is marginal and consistent. Sudden changes in the number of policy violations can be used as an indicator of malicious activity and can be identified by the CDN 121 through collection of observed data and comparison to the 'normal' number of policy violations during a sampling interval taken during normal operation of the system. The comparison can be executed using malware rules 223 that indicates whether a change in volume provided by a comparison of the observed data and sample data is indicative of a malware infection.

Yet another system activity that can be monitored by the CDN 121 is the operation of malware. Observed data can include the volume of malware detected at each node. According to some implementations, malware can be detected at each node by a virus scan. The CDN 121 can identify sudden increases in malware by comparing the observed volume of malware with sample volume of malware for a same time interval during normal operation of the system. As discussed above, whether an increase in the volume of malware is deemed a malware infection is based on malware rules 223. In some implementations, observed data can also include the direction of malware (upload vs. download) that is detected. The CDN 121 can identify spikes in uploading or downloading of malware. The variation of volume of malware detected in the outbound traffic in proportion to the inbound traffic can also be monitored. For instance, the CDN 121 can identify a malware infection when a sudden increase in outbound traffic occurs with respect to inbound traffic, which could be based on a the attack of many hosts from a single infected host.

Another system activity is the serving of error pages. Observed data including the number of error pages returned may be tracked to identify potential malicious activity. For instance, a spike in the number of observed error pages as compared to the expected number of error pages may be presumed to be the result of malicious activity.

Yet another system activity is the serving of web pages having a particular category. For instance, observed data can include the number of web pages served or accessed having a particular classification, such as 'infected'. A sudden increase in the number of infected web pages served, for instance, may result in the CDN 121 identifying malicious activity. Additionally, sudden changes in the category of sites (detected by the content inspection engines) reported may be indicative of malicious activity.

Observed data for web pages may also include web page classifications based on URL and based on web page content. The malware rules 223 may be configured to deem that an inconsistency in these classifications may be indicative of suspicious activity, and malware rules 223 can indicate that a particular volume of such inconsistencies is indicative of malware activity. Yet additional observed web page related data is a change in the category of top 'N' sites over any period of time. Because malicious activities can 'phone-home' and connect to similar servers, sudden activity resulting in unknown or malware categories of URLs falling within the top 'N' accessed and/or requested sites may be deemed to indicate a malware outbreak. Thus, the identification of possible malware activity may be based on detecting web site abnormalities over time, and/or on the abnormality of website requests over time. Both types of abnormalities are captured by the CDN 121.

§3.0.2 Variations in Observations of Abnormalities

As described above, the CDN 121 uses malware rules 223 to identify if one or more networks within the system are subject to malicious activity. Because malicious activity leads to abnormal statistical records, the malware rules can identify possible malicious activity through a comparison of statistical and observed data. Although described above with respect to example system activities where observed data for a single system activity can result in the presumption of malicious activity, the malware rules 223 may require a cumulative number of instances, over a period of time, in which observed data vary from an expected range, percentage, average, mean (or the like) from sample data.

According to some implementations, abnormalities in observed data identified by the malware rules 223 are counted and tracked as a time series. Three types of abnormalities may be indicative of a malware outbreak. First, a mild increase in a statistical activity followed by a sporadic increase in another statistical activity after a period of time may be indicative of malicious activity. Secondly, multiple sets of abnormal activities spaced in time may indicate malicious activity. An example of this kind occurs when malicious activity is prevented by the security policies which block malicious content. A third type of outbreak pattern occurs when there is a single, sudden peak in a particular activity. This can occur, for instance, where security policies of a company are not strong enough to protect against an attack. When malware is propagated by a chain of activities such as a visit to an infected site, this could cause a malicious program such as a back-door or Trojan to be downloaded which in turn downloads other malicious code which then causes other infected sites to be visited. This pattern could produce progressively increasing peaks in observed data for a particular system activity.

The malware rules 223 can be configured, for instance, by a system administrator, to account for each of the above abnormalities that are based on the receipt of observed data at the CDN 121. As an illustrative example, if malware is detected more than 'X' number of times, such as 50, then an alert can be generated.

§3.0.3 Generation of Alerts

When the observed data falls outside of parameters established by the malware rules 223, the CDN 121 can generate an alert. An alert can be to an administrator associated with the system 100 or one or more of the networks, and can be an e-mail, instant message, or the like. An alert can also include corrective action to prevent activity that is causing generation of the data that does not represent the normal operation of the monitored networks.

§4.0 Example Processes of Guest Account Management

Cloud based security, such as provided by the exemplary architecture discuss above, can serve as a platform for providing guest account management. For example, such guest accounts can be created and supported via authority node 120 with application of security policies by process node 110. Cloud based security can easily scale to a changing volume of users that require guest accounts. Further, cloud based security may further provide logs and audit trails regarding guest account usage.

A guest account is preferably a floating account, which has no access until it is associated with a user. In such implementations, guest account usage is time multiplexed; i.e. the same guest account can be used by another guest in a non-overlapping time period. The account association may be short-lived. At the end of the time period, the association is decoupled. It is the ability to perform fast life cycle management of accounts that distinguishes guest accounts from other account types.

Cloud based security may provide a number of administrative roles for the safe implementation of its security policies. For example, a specific administrative role may be allocated to the creation of enterprise wide security policies. Another role can be created for user administration and policy association with users. Another role can be devoted for configuration of the system and its operation. A fourth role can be management of special users such as visitors/guests. This distribution of responsibility may make security breaches less frequent as breaches may require security lapses at multiple levels. The present application discusses exemplary methods, systems and software that support the role of managing guest accounts. Such a role maybe associated with a front desk which performs visitor administration or with other local or remote enterprise administrator(s).

An enterprise may have multiple guest accounts each having a user identity, but no real user attached. An enterprise may have multiple user groups which are Guests and each such Guest group may have an independent guest group administrator. The term "guest administrator" refers to the administrator of one or more guest groups and/or locations. The cloud based security system may also allows users to be grouped under organizational units such as (Engineering, Sales, Marketing, Guests, etc) and/or along enterprise facilities such as (Manufacturing, Research, Operations, etc). Guests may be guests to a specific facility where each facility may have a Guest user group. In various implementations, administration of guests may involve the administration of a Guest user group under an organizational unit, facility or the enterprise as a whole. Administrative responsibilities may reside in whole with, or distributed among, front desk personnel, unit/facility system administrators and/or enterprise system administrators.

Cloud based security services are usually sold in a per seat pricing model. Depending on the volume of guests, more cloud based security accounts may be subscribed in a very short time to absorb the surge in the guests, while a relatively small pool of accounts may be kept allocated. For example, enterprises may choose to have a small number of accounts for their visitors and may organize the accounts in a per location (department, building, etc) manner. Internet cafes, on the other hand, may have a fixed allocation, which typically is equal to the number of internet terminals they have. Coffee shops may have an allocation which is a portion of their maximum occupancy and may request additional subscriptions for sudden surges in requirements. An organization may subscribe to 500 seats for the use of the employees, and 50 seats for guests—visitors, contract and temporary workers, partners etc. Some businesses may have 50 seats for use of the employees deemed permanent and 500 seats for guests or employees on shift.

Guest accounts may be terminated in a relatively small fixed time period. For example, Kiosks, internet cafes, coffee shops and hotels may provide access for a limited time period. The time period may be known in advance or may be known at the end of usage. For example, a visitor may request access for 1 hour and may renew the access for another hour. Enterprise hosts may provide internet access to their visitors while they are present in the enterprise. It may be desirable for the Enterprise to provide internet access such that the visitor is protected from malicious content, limited in their bandwidth usage, and preferably isolated from the on-premise security appliances.

The guest accounts may be pre-provisioned accounts with pre-packaged security policies, which include rules such as inspect encrypted content, deny P2P and instant messaging, deny or inspect Email attachments, etc. The security policies may further include a variety of usage restrictions such as time limitations, bandwidth limitations, etc. In addition, or instead, guest accounts can be created and provisioned individually or in pools on an as needed basis. Exemplary security policies include simple malware protection, URL filtering, and data leakage prevention. Policies may have been chosen at an enterprise level, a location level and/or at a user group level. Irrespective of the specific mechanism used, one or more security policies may be associated with guest accounts individually and/or in specified groupings.

During the account's usage by the guest, the guest may perform multiple login and logout events until the account is finally relinquished to the host. In some implementations, even after the account is relinquished, the account activities may be available with respect to the current holder of the guest account. In other implementations, guest accounts can be kept as anonymous accounts with little or no persistent tacking and/or auditing capability. For example, with a set of fixed user names such as guest1@acme.com, . . . , guestn@acme.com.

In some implementations, it may be desirable to log guest account usage for regulatory authorities (and others as well); consequently, audit trails which track the account association and dissociation in a chronological order is preferable to link guest account logs to guest account users. Such functionality can be supported via communication of usage information from processing node 110 to storage node 140. In such implementations, guest accounts are audited accounts with each guest user creating a binding with the guest account using some identifying information. For instance, the binding could include one or more of the following types of identifying information: an identification number (phone number, social security number, employee id number), the user name and password, name, etc. The identity of the account is unchanged under this association, so that users are known locally to the enterprise. In some such embodiments, user activities may be tracked across multiple different guest account bindings whether such multiple guest accounts are used concurrently and/or sequentially by the user.

A guest association with a guest account may set a time limit for the association. If a time limit is set, at the end of the time limit, the association is reset. Otherwise, the association may be reset when the account is no longer in use by the associated guest. Alternatively, an administrator may perform expiration, and reset of the guest association manually. Upon reset, however, a record of the user's association, and any activity logs associated with the bound usage, may be maintained.

Figure 3:
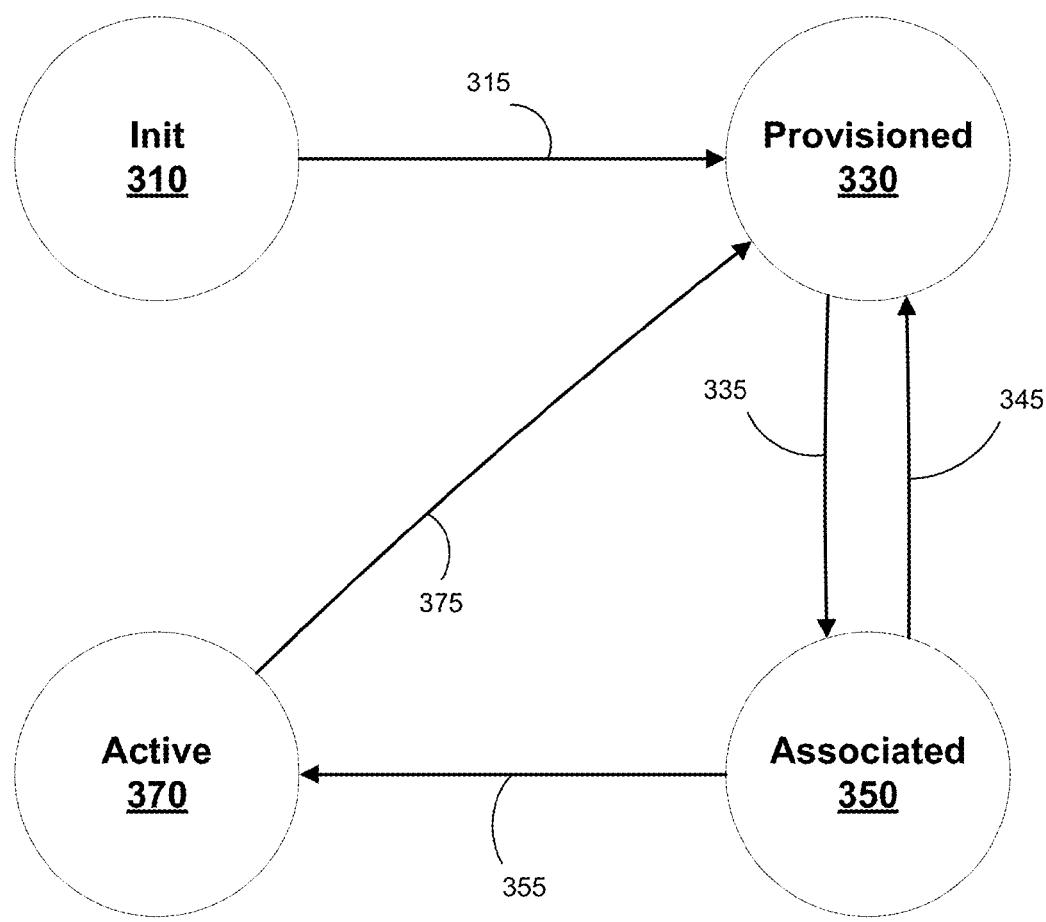
FIG. 3 is a state transition diagram depicting states and transitions in a preferred approach to guest account management.

In one preferred approach, a guest account may be in one of the following states as depicted in FIG. 3.

1. Init 310—An enterprise has subscribed to a number of user accounts, but no guest accounts have been configured.

2. Provisioned 330—Guest group may be created, and a number of accounts are allocated to one or more groups and/or locations. The user identity(ies) and policy(ies) are established. The accounts have no real user names and credentials defined, and the account cannot yet be used in a logon authentication.

3. Associated 350—A visitor has requested access to a guest account, and identifying information associated with the guest is communicated to the cloud based security system. A real user is associated with the account and initial credentials such as an initial password or a client certificate public key is issued to the guest user.

4. Active 370—The associated guest user has logged-in to the cloud based system. Active accounts can be used to access the services through the cloud based security services.

Continuing with the exemplary guest account states above, an account may become "Provisioned" in various ways. For example:

1. A new guest account is created and attached with the guest policy of the enterprise.

2. An administrator disables the guest account, due to various reasons including the guest leaving the premise.

3. Associated validity time limit has been reached.

In one implementation, guest accounts may go through the following state transitions as further depicted in FIG. 3.

Init→Provisioned 315:: Administrator creates a fixed number of guest accounts and associates the pre-packaged guest policy(ies). Policies are created by the information security officers of the company and/or guest administrators. An organization's location may spread over multiple buildings; each may have its own set of guest users and/or associated guest policy(ies).

Provisioned→Associated 335:: The reception/front desk/guest administrator captures guest user identifying information, for example, (1) a phone number, (2) name, (3) identification number, etc. The information may be captured automatically such as via an access card issued to the guest and used to enter the premise. Alternatively, the information may be manually entered. In some instance, a time limit for guest account usage may be specified, or a default limit may be used. In the case of a specified time limit, a time limit maximum may be checked.

Associated→Active 355:: The guest user enters the initial credentials, and, in some embodiments, the new credentials for subsequent login are generated.

Active→Provisioned 375:: Guest account is disabled due to, for example, (i) time expiry, (ii) administrative action, and (iii) guest leaving premise causing administrative action.

Associated→Provisioned 345:: Guest account's configured time expires, or administrator initiates an account disassociation.

There are other variations that can be applied to the account. For example, there can be a different timeout period for associated state which is much smaller than the time period given for the account usage.

Account information may show the last login IP address.

In various implementations, system can allow the guest administrator to dissociate a guest account, dissociate all guest accounts of a given group and/or location, and/or associate an account with a user, a time limit and/or a temporary password or other credentials. The temporary password may be system generated and provided to the guest by any viable means, such as sent to the guest's PDA (Phone, Pocket PC, Smart Phone, NetBook, Tablet PC) etc as an SMS message or conveyed in a printed or written medium. The administrator may be able to view the current and/or past status of the guest accounts as well as see an audit trail of guest activity, which in some implementations may further include the real name of the person associated with the guest account. Administrative operation may affect a single guest account, a set of guest accounts (possibly by group or location designation or as an ad hoc defined set of accounts), or all of the guest accounts. Standard password administration mechanisms may be used for keeping the privacy of the password (only guest knows the password).

Guest account management access may occur through administrative screens generated by user interface front-end 130 and provided to an administrator via a browser or other special purpose application. Alternatively, or in addition, specially adapted client applications can be used to communicated with the management systems; user interface front-end 130 could also serve as point of communication with the cloud based security system for such specially adapted client applications. The administrative interface may be provided to the administrator on-site where the guest account is to be used or at a remote location such as a central location administering guest account across multiple locations. Any suitable protocol may be used to communicate the administrative functions from the administration location to the cloud based service.

The interface can support a variety of functions that may include in various implementations: policy configuration, reports, and registration/deregistration. Policy configuration may allow an administrator to designate usage policies with respect to one or more guest accounts and/or groups of guest accounts. Such policies may be those discussed above with respect to various checks and rules applied by processing node 110. The policies may also include absolute or default specification of timeouts or expirations associated with one or more guest accounts and/or groups of guest accounts. Administrators may further see reports of guest account usage. Such reports may include reports directed to specific guest account usage, aggregate guest account usage for example by location, group, or time, aggregate across different associated guest accounts by an identifiable user, and the like.

Figure 4:
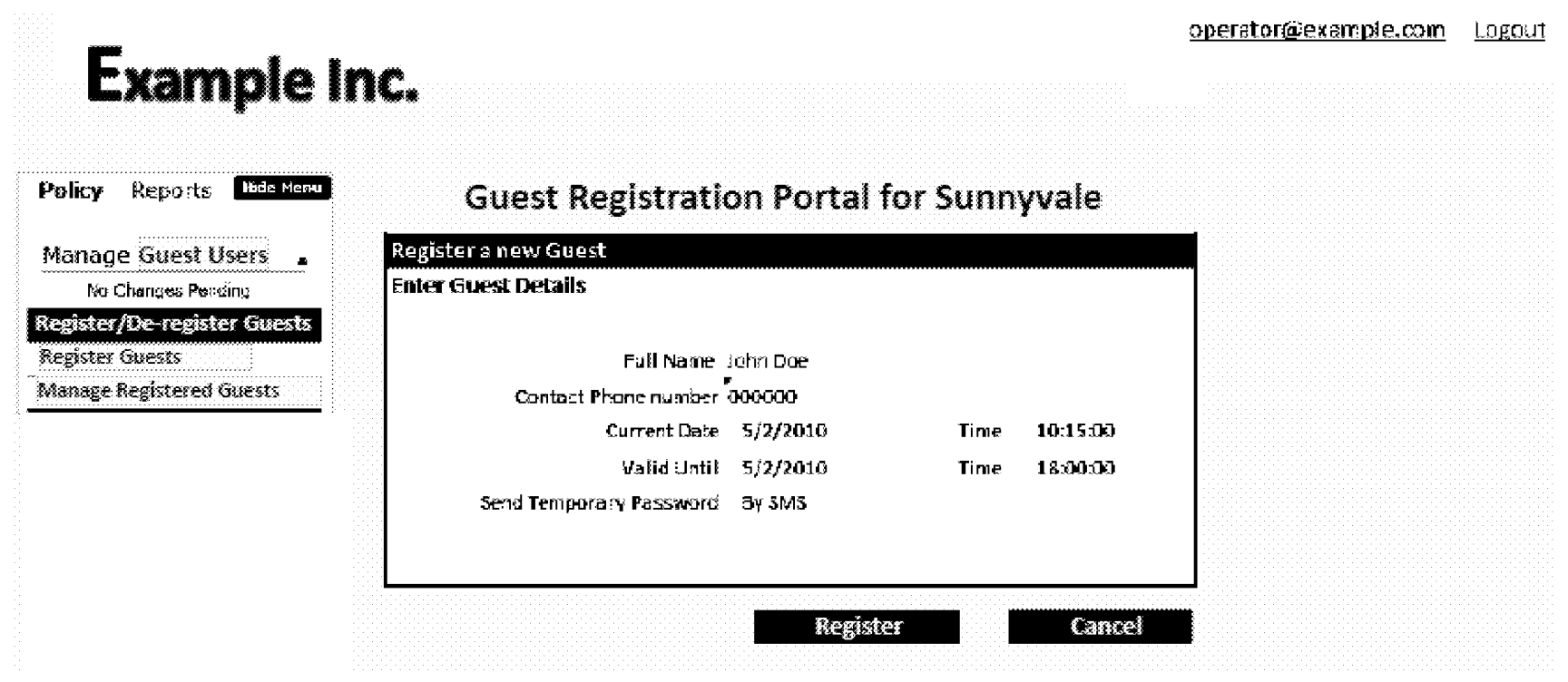
Figure 5:
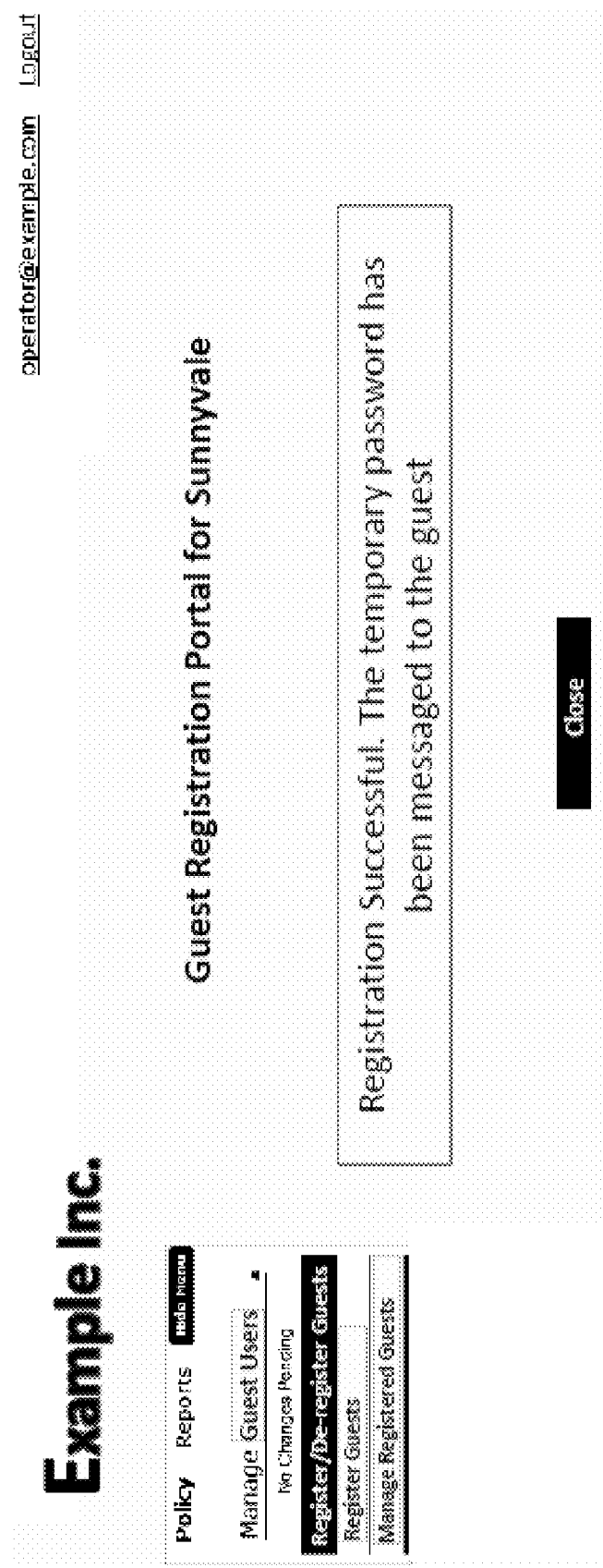
FIG. 5 depicts an example acknowledgment for a registration with SMS delivery of initial credentials.
Figure 7:
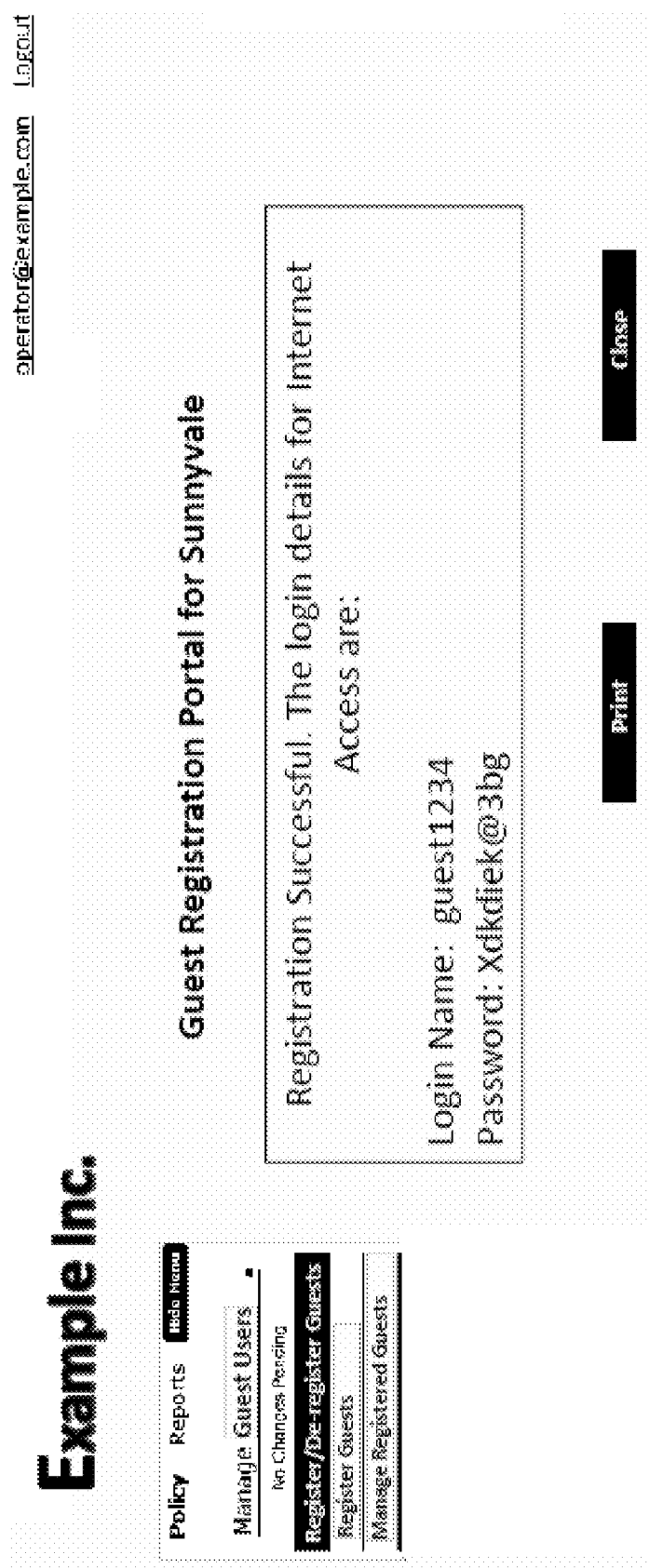
FIG. 7 depicts an example acknowledgment for a registration with print delivery of initial credentials.

FIG. 4 depicts a sample account management screen. During guest registration, guest account information is entered by a guest administrator and/or pre-populated according to guest account defaults established by the enterprise issuing the guest account. Identifying information regarding an individual to associate with an account such as name of the individual and/or a phone number is included in the registration request. Such identifying information can be entered manually by the administrator or automatically received from a card or device associated with the individual. In the depicted example, the registration request includes a specification that initial credentials should be delivered to the individual via SMS. An example acknowledgment screen is seen in FIG. 5. FIGS. 6-7 depict example registration and acknowledgment screens where the initial credentials are provided to the individual on a printed media.

A user may initiate a logout transaction a variety of ways. For example, a logout link may be added to every page that the user visits. Alternatively, a logout page may be popped under the first login page. As a further example, a URL that explicitly addresses the process node 110 may be used to effect a logout operation.

Figure 8:
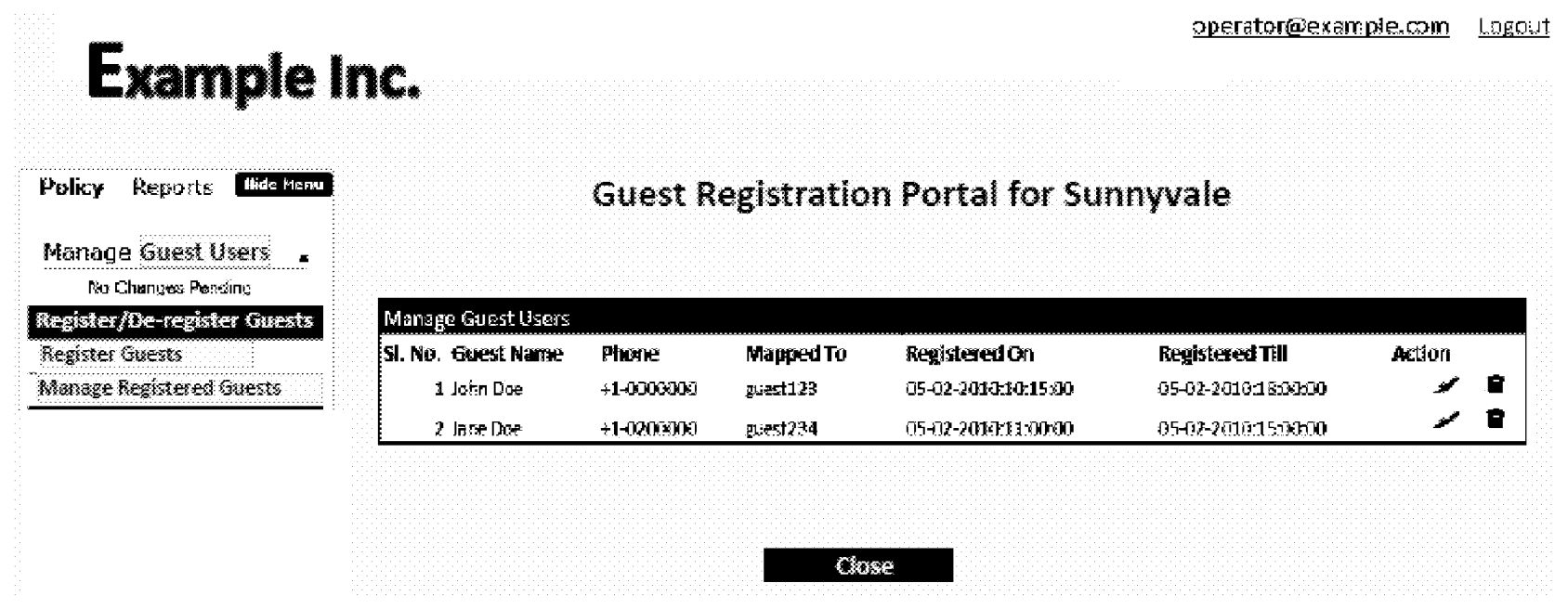

The logout operation may be validated for access using existing mechanisms such as domain cookies. A verification is preferably performed to assure that the user performing logout is in fact the user currently associated with the guest account. Additionally, administrative logouts may be performed using an administrative management screen. No guest user verification is necessary when an administrative logout occurs. FIG. 8 depicts an example guest account management screen that may support administrative logout and/or other guest account actions such as dynamic modification of time out and/or expiration periods associated with a guest account.

Through cloud based guest account management as described above,

No on-premise security appliance is necessary to provide safe internet access.

Guest's internet access may be logged to achieve regulatory compliance and can be produced when required.

Guest accesses may be safeguarded from security threats and data loss, and the internet experience is as safe as that would be offered from an on-premise security appliance.

Guest accounts can be re-used across a large number of successive guest users.

Organizations can be safeguarded from malicious activity, excessive bandwidth consumption and/or inappropriate content.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a non-transitory computer readable medium. The computer readable medium can be a machine readable storage device, a machine readable storage substrate, a memory device (volatile or non volatile), or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of volatile or non volatile memory, media and memory devices, including by way of example semiconductor memory devices, e.g., EPROM, EEPROM, RAM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. Other embodiments of the invention will be apparent to those skilled in the art from their consideration of the specification and practice of the invention disclosed in this document. The applicant intends that the specification and examples be considered as exemplary only, with the true scope and spirit of the invention being indicated by the following claims.

What is claimed is:

1. A guest account management method implemented on one or more cloud service computers, comprising the steps of:
   A) receiving at a cloud service computer a guest account request for a user of an external system, wherein the cloud service computer is part of a cloud based security system located externally from the external system on which the user is requesting access with the guest account request, wherein the external system comprises no on-premises security appliances for providing guest account management and access, and wherein the cloud service computer is communicatively coupled to the external system via the Internet;
   B) associating a first guest account with information identifying the user;
   C) generating initial credential for the first guest account;
   D) transmitting the initial credentials to an output device from which the user can receive the initial credential;
   E) logging-in the first guest account upon receipt of the initial credentials from a client device;
   F) receiving a service request from the client device, wherein the client device connects to the cloud service computer for all requests comprising the service request over the Internet via a tunnel, a transparent proxy, a forward proxy, or redirection, and wherein the request are relayed to the Internet responsive to the logging-in;
   G) servicing the service request;
   H) inspecting results of servicing the service request or the received service request for compliance with one or more service policies associated with the first guest account, wherein the one or more service policies comprise usage restrictions and content restrictions;
   I) forwarding the results to the client device; and
   J) adding information regarding the service request to an activity log associated with the user.

2. The method of claim 1, wherein forwarding the results to the client device only occurs if the received service request complies with the one or more service polices associated with the first guest account.

3. The method of claim 1, wherein forwarding the results to the client device only occurs if the results of servicing the service request comply with the one or more service polices associated with the first guest account.

4. The method of claim 1, further comprising the steps of K) initializing a fixed number of guest accounts, L) receiving one or more policies, and M) associating the received service policy with one or more guest accounts from the fixed number of guest accounts, and wherein the first guest account is selected from the fixed number of guest accounts.

5. The method of claim 4, and further comprising transmitting to a guest account administration device information that defines an interface via which one or more policies may be designated.

6. The method of claim 1, and further comprising the steps of K) assigning a time limit to the first guest account and L) logging-out the first guest account when the time limit has passed.

7. The method of claim 6, wherein the time limit is (a) an expiration date, (b) an expiration date and time, or (c) a duration.

8. The method of claim 6, and further comprising the steps of M) disassociating the first guest account from the information identifying the user and N) linking the activity log with the information identifying the user and the prior association with the first guest account.

9. The method of claim 1, wherein the guest account request comprises the information identifying the user.

10. The method of claim 1, wherein the guest account request comprises an identification of the output device.

11. The method of claim 1, and further comprising the steps of K) transmitting to a guest account registration device information that defines an interface via which information identifying the user and an identification of the output device can be entered and L) receiving from the guest account registration device the information identifying the user and the identification of the output device.

12. The method of claim 1, wherein the output device is associated with the user.

13. A cloud service system that manages guests accounts, the cloud service system comprising:
   a plurality of servers forming a cloud based security system located externally from an external system on which a user is requesting access with a guest account request, and wherein the external system comprises no on-premises security appliances for providing guest account management and access, wherein the plurality of servers are communicatively coupled to the external system via the Internet, each of the plurality of servers comprises:
   A) a data store comprising storage elements capable of storing information related to accounts and service policies; and
   B) a system processor comprising one or more processing elements, wherein the system processor is communicatively coupled to the data store and is configured or programmed to at least:
      i) receive the guest account request for the user;
      ii) associate a first guest account with information identifying the user;
      iii) generate initial credential for the first guest account;
      iv) transmit the initial credentials to an output device from which the user can receive the initial credential;
      v) log-in the first guest account upon receipt of the initial credentials from a client device;
      vi) receive a service request from the client device, wherein the client device connects to the cloud based security system for all requests comprising the service request over the Internet via a tunnel, a transparent proxy, a forward proxy, or redirection, and wherein the request are relayed to the Internet responsive to the log-in;
      vii) service the service request;
      viii) inspect the received service request and results of servicing the service request for compliance with one or more service policies associated with the first guest account, wherein the one or more service policies comprise usage restrictions and content restrictions; and
      ix) if the received service requests and the results comply with the one or more policies, forward the results to the client device.

14. The system of claim 13, wherein the system processor is further configured or programmed to add information regarding the service request to an activity log associated with the user.

15. The system of claim 13, and further comprising a second communication interface communicatively coupled to the system processor, wherein the second communication interface allows the cloud service computer to communicate over a second communication channel different from the first communication channel and wherein the system processor transmits the initial credentials to the output device via the second communication interface.

16. One or more non-transitory computer readable-media storing instructions that upon execution by one or more cloud service system cause the system to at least:
   A) receive a guest account request for a user;
   B) associate a first guest account with information identifying the user;
   C) generate initial credential for the guest account;
   D) transmit the initial credentials to an output device from which the user can receive the initial credential;
   E) log-in the guest account upon receipt of the initial credentials from a client device;
   F) receive a service request from the client device;
   G) service the service request;
   H) inspect the received service request and results of servicing the service request for compliance with one or more service policies associated with the first guest account, wherein the one or more service policies comprise usage restrictions and content restrictions;
   I) if the received service request and the results comply with the one or more policies, forward the results to the client device; and
   J) add information regarding the service request to an activity log associated with the user;
   wherein the cloud service system is part of a cloud based security system located externally from an external system on which the user is requesting access with the guest account request, wherein the external system comprises no on-premises security appliances for providing guest account management and access, wherein the cloud service system is communicatively coupled to the external system via the Internet, and wherein the client device connects to the cloud service systems for all requests comprising the service request over the Internet via a tunnel, a transparent proxy, a forward proxy, or redirection, and wherein the request are relayed to the Internet responsive to the log-in.

17. The method of claim 1, wherein data communications from the user is from the external network to the cloud service computer such that all the data communications to and from the user are through the cloud service computer.

18. The method of claim 17, wherein the user connects to the cloud service computer through the Internet via a tunnel, a transparent proxy, a forward proxy, or redirection.

19. The method of claim 17, wherein the data communications from the user destined for the external network are sent to the cloud service computer external from the external network for processing thereon.

20. The method of claim 1, wherein the usage restrictions comprise time limitation and bandwidth limitations and the content restrictions comprise rules related to inspection of encrypted content, allowability of P2P traffic and instant messaging, and inspection of email attachments.

* * * * *